United States Patent [19]

Pyles et al.

[11] Patent Number: 4,663,433
[45] Date of Patent: May 5, 1987

[54] SEPARATION OF CYCLIC OLIGOMERIC CARBONATE FROM HIGH MOLECULAR WEIGHT POLYCARBONATE

[75] Inventors: Robert A. Pyles, Evansville; Patrick J. Mulvey, Mt. Vernon, both of Ind.

[73] Assignee: General Electric Company, Mt. Vernon, Ind.

[21] Appl. No.: 812,449

[22] Filed: Dec. 23, 1985

[51] Int. Cl.$^4$ ............................................. C08G 63/62
[52] U.S. Cl. .................................. 528/496; 528/196; 528/498
[58] Field of Search ........................ 528/496, 498, 196

[56] References Cited

U.S. PATENT DOCUMENTS

| | | | |
|---|---|---|---|
| 3,213,060 | 10/1965 | Jackson et al. | 528/493 |
| 3,264,262 | 8/1966 | Baker et al. | 528/498 |
| 3,264,263 | 8/1966 | Baker | 528/498 |
| 3,410,823 | 11/1968 | Cleveland | 528/493 |
| 3,668,181 | 6/1972 | Oxenrider | 528/498 |

OTHER PUBLICATIONS

Chemistry and Physics of Polycarbonates, Schnell, 1964, pp. 99–101.

*Primary Examiner*—Harold D. Anderson
*Attorney, Agent, or Firm*—Martin B. Barancik

[57] ABSTRACT

A process for separating cyclic oligomeric dihydric phenol carbonate from high molecular weight linear aromatic polycarbonate which comprises admixing a solution of aromatic polycarbonate and oligomeric dihydric phenol carbonate in a halogenated organic solvent with an antisolvent selected from the group consisting of butanol, isobutanol and an alkane of from five to about nine carbon atoms, inclusive, separating the solid aromatic polycarbonate from the solution of cyclic oligomeric dihydric phenol carbonate, increasing the antisolvent to halogenated organic solvent ratio and thereby precipitate the cyclic oligomeric dihydric phenol carbonate.

10 Claims, No Drawings

SEPARATION OF CYCLIC OLIGOMERIC CARBONATE FROM HIGH MOLECULAR WEIGHT POLYCARBONATE

BACKGROUND OF THE INVENTION

Polycarbonate is a well known thermoplastic polymer useful for applications wherein good electrical resistance, distortion temperature under load and impact resistance are valuable properties. There are many known processes for preparing polycarbonate, including inter alia the lime process, the pyridine process, melt polymerization, transesterification, solution process, and interfacial polymerization. Virtually all of these, if not all of these processes, start out initially with a dihydric phenol and a carbonate precursor. As in almost all other reactions there is not 100% yield of the desired high molecular weight aromatic polycarbonate. There are side reactions which bring about product other than the desired polycarbonate. Some of these well known side products are diphenyl carbonate, sodium carbonate, and linear oligomers of the desired polycarbonate. In order to enhance the properties of the polycarbonate it is important to minimize side reaction products present in the polycarbonate. Usually the approach taken is to minimize the side reaction as opposed to removal of the side reaction product because of the additional, sizeable expense involved.

A new and inexpensive method of purifying high molecular weight aromatic polycarbonate has been found. In addition, it has been found in the laboratories of the assignee that the side reaction product is particularly rich in cyclic polycarbonate oligomers. These oligomers can be isolated and further polymerized to linear high molecular weight polycarbonate per se. A further use of the cyclic oligomers is the addition to or the impregnation with fibrous materials such as glass, carbon or aramid fibers followed by the in situ polymerization of the polycarbonate to form composites having great modulus strength.

SUMMARY OF THE INVENTION

In accordance with the invention, there is a process for separating cyclic oligomeric dihydric phenol carbonate from high molecular weight linear aromatic polycarbonate which comprises admixing a solution of aromatic polycarbonate and oligomeric dihydric phenol carbonate in a halogenated organic solvent with an antisolvent selected from the group consisting of butanol, isobutanol and an alkane of from five to about nine carbon atoms, inclusive, separating the solid aromatic polycarbonate from the solution of cyclic oligomeric dihydric phenol carbonate, increasing the antisolvent to halogenated organic solvent ratio and thereby precipitate the cyclic oligomeric dihydric phenol carbonate.

DETAILED DESCRIPTION OF THE INVENTION

The aromatic polycarbonates which are employed in the invention are the usual type of polymer prepared from a dihydric phenol and carbonate precursor.

Any dihydric phenol can be employed in the reaction procedure to prepare the aromatic polycarbonate.

Examples of such dihydric phenols include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;
4,4'-thiodiphenol; and
4,4'-dihydroxy-2,6-dimethyldiphenyl ether.

The preferred dihydric phenols are of the formula

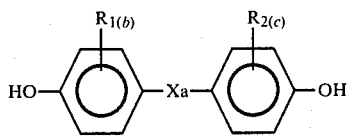

FIG. 1 wherein a is 0 or 1, =
X is alkylene of two to eight carbon atoms, inclusive, alkylidene of one to eight carbon atoms, inclusive,

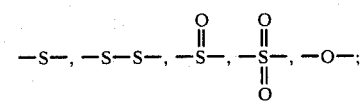

$R_1$ and $R_2$ are the same or different and are alkyl of one to four carbon atoms, inclusive, chloro or bromo, b and c are the same or different and are 0, 1 or 2.

Preferably a is 1, b and c are 0, and X is 2,2-isopropylidene.

Copolymers where there is more than one dihydric phenol are included within the definition of aromatic polycarbonate. Generally the distribution of dihydric phenols in the cyclic oligomer is similar to the distribution in the high polymer. The high molecular weight aromatic polycarbonate generally has a minimum intrinsic viscosity (I.V.) dl/g. of about 0.3, preferably above about 0.4 as measured in methylene chloride at 25° C. The maximum I.V. is not significant, but for processing purposes an I.V. of less than about 1.0 is preferred.

The cyclic oligomeric dihydric phenol carbonate to be separated from the aromatic polycarbonate is specifically prepared by processes well known in the art or as has been newly discovered in these laboratories is prepared as a side reaction product in the normal preparation of aromtic polycarbonate. For example, in the interfacial polymerization of bisphenol-A and phosgene in sodium hydroxide at alkaline pH and methylene chloride, a significant amount of cyclic oligomeric dihydric phenol carbonate is formed. Of the 0.5 to 1.5 weight percent side reaction products generally formed greater than or equal to about 50 weight percent and sometimes up to about 70 weight percent or more of the side reaction product is cyclic oligomeric dihydric phenol carbonate. The cyclic oligomer has an intrinsic viscosity significantly below 0.3 and generally has no more than about 16 mer units. Examples of I.V. for purified cyclic oligomer include 0.072, 0.090 and 0.100. In FIG. 2 below is an example of cyclic oligomer utilizing bisphenol-A as the dihydric phenol.

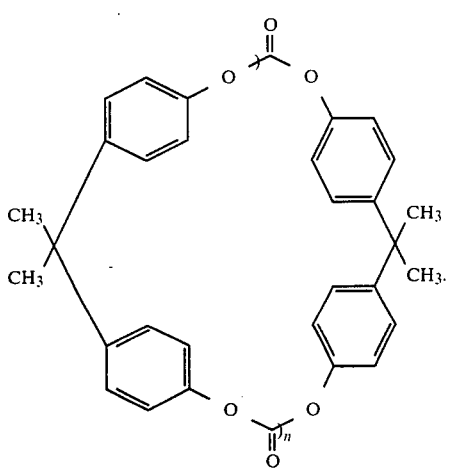

FIG. II n is an integer of 1 to about 15, preferably 1 to about 11. Obviously mixtures of cyclic oligomers of various number, of mer units comprises the cyclic oligomer side product.

The halogenated solvent which is used to solubilize both the aromatic polycarbonate and the cyclic oligomer are those commonly known solvents such as methylene chloride, cis-1,2-dichloroethylene, chlorobenzene and the like, preferably methylene chloride. The percentage of aromatic polycarbonate to cyclic oligomer in the solvent is not unduly significant. Generally, the percentage is from about 5-99.5 weight percent polymer and about 95-0.5 weight percent oligomer, preferably about 10-40 weight percent polymer and 10-40 weight percent polymer and about 90-60 weight percent oligomer.

The antisolvent(s) employed in this invention make the aromatic polycarbonate polymer selectively precipitated from the solution and also bring about the selective precipitation at higher ratios of antisolvent to halogenated organic solvent of the cyclic oligomer. A fractional crystallization has thereby occurred to physically separate the aromatic polycarbonate from the cyclic oligomer. Antisolvents which accomplish this selective precipitation include butanol, isobutanol and alkanes such as pentane, hexane, heptane, octane and nonane in their normal form or branched forms as well. Alkanes of from five to seven carbon atoms are preferred. Of these normal alkanes are particularly useful. A small quantity of antisolvent added to the solution will bring about substantial precipitation of the aromatic polycarbonate. The exact quantity of antisolvent depends upon the specific solvent and quantity of solvent employed as well as the quantity of aromatic polycarbonate present in solution. By increasing the ratio of antisolvent to solvent, for example either by admixing further antisolvent or selectively removing solvent, the cyclic oligomer then selectively precipitates relative to the aromatic polycarbonate. Although generally not a problem in most precipitations the viscosity of the initial solution can be very high because of the presence of the aromatic polycarbonate and brings about filtration problems. A number of potential antisolvents were not deemed successful because the precipitate was not filterable under ordinary circumstances.

Until this invention, the addition of acetone to a methylene chloride solution containing both aromatic polycarbonate and cyclic oligomer was the standard method of separation in these laboratories. Although such addition brought about the precipitation of aromatic polycarbonate, the cyclic oligomers were too soluble in the remaining solvent compositions to precipitate. Rather the cyclic oligomers were recovered upon evaporation of the methylene chloride and acetone solution using steam precipitation. In this prior process, two distillation steps are necessary for solvent recovery, separation of methylene chloride from acetone and water which results from steam precipitation of the aromatic polycarbonate in the original aromatic polycarbonate recovery schemer. Additionally, boiling acetone to recover the cyclic oligomer requires the cost of steam energy. Still further, it is rather difficult to recover methylene chloride (bp 40° C.) from acetone (bp 50° C.) and water both quantitatively and in pure form in an inexpensive manner.

The use of the antisolvents of this invention alleviate virtually all of the problems. A fractional precipitation occurs wherein the aromatic polycarbonate is readily removed from the solution so that the further increased ratio of antisolvent to solvent brings about the selective precipitation, relative to aromatic polycarbonate, of the cyclic oligomer. The antisolvent enrichment can occur by the addition of more antisolvent or simply distilling the methylene chloride. Recovery of the antisolvent is a matter of simple distillation. In addition the separation of acetone, methylene chloride and water as a solvent recovery step is no longer necessary.

Below are examples of the invention. These examples are intended to illustrate rather than narrow the inventive concept.

EXAMPLE 1

A cyclic oligomeric bisphenol-A carbonate containing sample was prepared and analyzed. The sample contained 70 weight percent cyclic oligomer and 30 weight percent high molecular weight linear aromatic bisphenol-A polycarbonate. Twelve (12) grams of the solid sample was added to 88 grams of methylene chloride. Sufficient heptane was added to the solution to give 30 weight percent heptane - 70 weight percent methylene chloride. The precipitate was filtered and dried. Of the 6.78 grams of dried solids analyzed, 42.59 weight percent was cyclic oligomer, 57.41 weight percent was high molecular weight linear aromatic polycarbonate.

More heptane was added to the solution to obtain 70 weight percent heptane - 30 weight percent methylene chloride. The precipitate was filtered and dried. 3.06 grams of dried solids were analyzed. 99.04 weight percent was cyclic oligomer.

The filtrate was rotoevaporated. Only 0.15 grams of solid material were recovered.

This example shows the essentially complete separation of cyclic oligomer from high molecular weight linear aromatic polycarbonate. Isobutanol and butanol behaved in a similar manner. However, other common solvents could not affect a separation of the two materials because of insufficient selective solubility and/or an inability to readily filter the precipitate from the mother liquor. Examples of such solvents include acetone, ethyl acetate, toluene, methylisobutyl ketone, pentanol and methanol.

What is claimed is:

1. A process for separating cyclic oligomeric dihydric phenol carbonate from high molecular weight linear aromatic polycarbonate which comprises admixing a solution of aromatic polycarbonate and oligomeric dihydric phenol carbonate in a halogenated organic solvent with an antisolvent selected from the group consisting of butanol, isobutanol and an alkane of from five to about nine carbon atoms, inclusive, to precipitate the aromatic polycarbonate, separating the precipitated solid aromatic polycarbonate from the cyclic oligomeric dihydric phenol carbonate, increasing the antisolvent to halogenated organic solvent ratio and thereby precipitating the cyclic oligomeric dihydric phenol carbonate.

2. The process in accordance with claim 1 wherein cyclic oligomer and aromatic polycarbonate are based on bisphenol-A.

3. The process in accordance with claim 1 wherein the halogenated organic solvent is methylene chloride or cis-1,2-ethylene dichloride.

4. The process in accordance with claim 1 wherein the solvent is methylene chloride.

5. The process in accordance with claim 1 wherein the antisolvent is butanol or isobutanol.

6. The process in accordance with claim 1 wherein the antisolvent is isobutanol.

7. The process in accordance with claim 1 wherein the antisolvent is an alkane of from five to about seven carbon atoms.

8. The process in accordance with claim 7 wherein the alkane is normal.

9. The process in accordance with claim 8 wherein the alkane is n-heptane.

10. The process in accordance with claim 2 wherein the halogenated organic solvent is methylene chloride and the antisolvent is isobutanol or n-heptane.

* * * * *